United States Patent
Hayashi

(10) Patent No.: US 8,918,283 B2
(45) Date of Patent: Dec. 23, 2014

(54) NAVIGATION APPARATUS

(75) Inventor: Kazutoshi Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1787 days.

(21) Appl. No.: 12/087,268

(22) PCT Filed: Jan. 9, 2007

(86) PCT No.: PCT/JP2007/050094
§ 371 (c)(1),
(2), (4) Date: Jun. 30, 2008

(87) PCT Pub. No.: WO2007/125658
PCT Pub. Date: Nov. 8, 2007

(65) Prior Publication Data
US 2009/0005976 A1    Jan. 1, 2009

(30) Foreign Application Priority Data
Apr. 26, 2006  (JP) .................................. 2006-122367

(51) Int. Cl.
G01C 21/36  (2006.01)
G01C 21/20  (2006.01)
G09B 29/00  (2006.01)
G09B 29/10  (2006.01)

(52) U.S. Cl.
CPC ............ *G01C 21/3626* (2013.01); *G01C 21/20* (2013.01); *G01C 21/367* (2013.01); *G01C 21/3673* (2013.01); *G09B 29/003* (2013.01); *G09B 29/10* (2013.01)
USPC ............................ 701/533; 701/410; 701/433

(58) Field of Classification Search
USPC .......................................... 701/200–210, 533
See application file for complete search history.

(56) References Cited

U.S. PATENT DOCUMENTS

| | | | |
|---|---|---|---|
| 5,757,359 A | | 5/1998 | Morimoto et al. |
| 6,052,645 A | * | 4/2000 | Harada .......................... 701/212 |
| 6,064,322 A | * | 5/2000 | Ohira ......................... 340/995.18 |
| 6,904,360 B2 | * | 6/2005 | Pechatnikov et al. .......... 701/532 |
| 6,937,936 B2 | * | 8/2005 | Nimura .......................... 701/208 |
| 7,171,305 B2 | * | 1/2007 | Minato et al. .................. 701/209 |

(Continued)

FOREIGN PATENT DOCUMENTS

| | | |
|---|---|---|
| DE | 103 36 581 | 4/2004 |
| JP | 05018767 | 2/1993 |

(Continued)

*Primary Examiner* — Kathleen Palavecino
(74) *Attorney, Agent, or Firm* — Birch, Stewart, Kolasch & Birch, LLP

(57) ABSTRACT

A navigation apparatus includes: a map data storage unit 11a for storing map data in which a guide map location pointer 20 is included in data showing each guide point; a guide map data storage unit 11b for, for each guide point, storing guide map data which are used for drawing different views as guide maps; a processing unit 17 for, when a detected current position reaches a guide point shown by map data acquired from the map data storage unit, acquiring guide map data corresponding to a current situation from a location of the guide map data storage unit which is shown by a guide map location pointer included in data showing the guide point, and combining the guide map data with the map data to generate display data; and a display output unit 15 for displaying a map and a guide map according to the display data.

5 Claims, 8 Drawing Sheets

(56) References Cited

U.S. PATENT DOCUMENTS

| | | | |
|---|---|---|---|
| 7,342,516 B2 * | 3/2008 | Kato et al. | 340/995.19 |
| 7,603,230 B2 * | 10/2009 | Suzuki et al. | 701/209 |
| 7,711,473 B2 * | 5/2010 | Sekine et al. | 701/200 |
| 2004/0204848 A1 * | 10/2004 | Matsuo et al. | 701/211 |
| 2004/0215388 A1 * | 10/2004 | Takenaka | 701/209 |
| 2006/0149467 A1 * | 7/2006 | Nakayama et al. | 701/211 |
| 2007/0073480 A1 * | 3/2007 | Singh | 701/211 |
| 2008/0162043 A1 * | 7/2008 | Emoto et al. | 701/211 |
| 2010/0023255 A1 * | 1/2010 | Nambata | 701/201 |
| 2010/0023257 A1 * | 1/2010 | Machino | 701/201 |
| 2010/0094549 A1 * | 4/2010 | Machino | 701/209 |
| 2011/0106431 A1 * | 5/2011 | Tomobe et al. | 701/201 |

FOREIGN PATENT DOCUMENTS

| | | |
|---|---|---|
| JP | 7-191612 | 7/1995 |
| JP | 7-191612 A | 7/1995 |
| JP | 09-113291 | 5/1997 |
| JP | 9-311623 | 12/1997 |
| JP | 9-311623 A | 12/1997 |
| JP | 10-148534 | 6/1998 |
| JP | 10-148534 A | 6/1998 |
| JP | 10-267668 A | 10/1998 |
| JP | 10-339649 | 12/1998 |
| JP | 10-339649 A | 12/1998 |
| JP | 2000-283784 A | 10/2000 |
| JP | 2000-292198 A | 10/2000 |
| JP | 2005-214693 A | 8/2005 |

* cited by examiner

NAVIGATION APPARATUS

FIELD OF THE INVENTION

The present invention relates to a navigation apparatus which guides a user when a vehicle equipped with the navigation apparatus reaches a guide point which is set up in the vicinity of, for example, an intersection or a branch point by displaying a view of the guide point as a guide map. More particularly, it relates to a technology of displaying a guide map with excellent visibility.

BACKGROUND OF THE INVENTION

Conventionally, a navigation apparatus which displays a map on a display and performs route guidance is known. When a user sets up a destination, this navigation apparatus searches for an optimal route from the current position of a vehicle equipped with the navigation apparatus to a destination, and stores this optimal route as a route to be traveled. When the vehicle starts traveling and the navigation apparatus starts route guidance, the navigation apparatus carries out detection of the current position of the vehicle sequentially, displays the current position of the vehicle and the route to be traveled on an on-screen map including the detected current position, and makes guidance. When the vehicle then reaches a vicinity of a branch point of the route to be traveled, the navigation apparatus displays a guide map consisting of a three-dimensional image which is easy for the driver to compare with a forward view which the driver is actually seeing, and also provides guidance for the driver by making a sound. Thus, the navigation apparatus enables the user to easily select the traveling direction at the time when the vehicle is travelling the route to be traveled with the map and the guidance using the guide map.

For such a navigation apparatus, a technology of reproducing a view which is close to an actual view which can be observed from the vehicle on the screen is known. For example, patent reference 1 discloses an image display method of displaying an image, such as a map associated with a time or a map having the sense of a season. In accordance with this image display method, a calendar timer monitors the current date, a multiplication constant generating unit generates multiplication constants CR, CG, and CB for R, G, and B data, respectively, in such a way that the image has a hue according to the current time, the current season, or the like, multipliers for R, G, and B multiply pieces of color information (RGB data) of the map outputted from a color palette by the multiplication constants CR, CG, and CB, respectively, so as to manipulate the pieces of color information of the map image, and the image is then displayed on the basis of the pieces of color information acquired through this manipulation. According to this image display method, the display color of the map screen can be changed in synchronization with either a preset time zone or the current season, an atmosphere of daytime or nighttime can be expressed, and the visibility can be improved.

[Patent reference 1] JP,9-311623,A

A problem with the technology disclosed by above-mentioned patent reference 1 is, however, that because color palettes each having a color tone which is suited to one of various situations are prepared in advance, and, when displaying an image, a color palette which is optimal at that time is selected and the image is displayed, when, for example, the number of situations which are set up in advance is n and the number of maximum colors which can be defined for each color palette is m, the number of colors which can be expressed in one certain situation is restricted to m/n. Another problem is that in the case of displaying an image in a bitmap format, because the maximum number of colors which can be define for each color palette is restricted to 256, the image cannot be displayed realistically. A further problem is that because a color palette having a different color tone is applied to image data except color information, there is a restriction that the image itself cannot be changed according to the situation.

The present invention is made in order to solve the above-mentioned problems, and it is therefore an object of the present invention to provide a navigation apparatus which can display a guide map according to the current situation without limit on the number of colors.

DISCLOSURE OF THE INVENTION

In order to solve the above-mentioned problems, a navigation apparatus in accordance with the present invention includes: a map data storage unit for storing map data in which a guide map location pointer is included in data showing each guide point; a guide map data storage unit for, for each guide point, storing a plurality of guide map data which are used for drawing different views as guide maps; a position detecting unit for detecting a current position; a situation acquiring unit for acquiring a current situation; a processing unit for, when the current position detected by the position detecting unit reaches a guide point shown by map data acquired from the map data storage unit, acquiring guide map data corresponding to the current situation acquired by the situation acquiring unit from a location of the guide map data storage unit which is shown by a guide map location pointer included in data showing the guide point, and then combining the acquired guide map data with the map data acquired from the map data storage unit so as to generate display data; and a display output unit for displaying a map and a guide map according to the display data generated by the processing unit.

The navigation apparatus in accordance with the present invention stores a plurality of guide map data used for drawing different views as guide maps for each guide point, and, when the current position reaches a guide point shown by map data, acquires guide map data corresponding to the current situation at the time and combines the guide map data with the map data to display a guide map and a map. As a result, because the navigation apparatus does not use any color palette, the navigation apparatus can increase the number of colors which can be displayed. Furthermore, because the navigation apparatus can prepare different images according to possible situations, the navigation apparatus can display an image which is closer to a forward view which the driver can actually see, thereby improving the visibility of the guide map. In addition, the present invention provides an advantage of being able to display the guide map with high quality.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
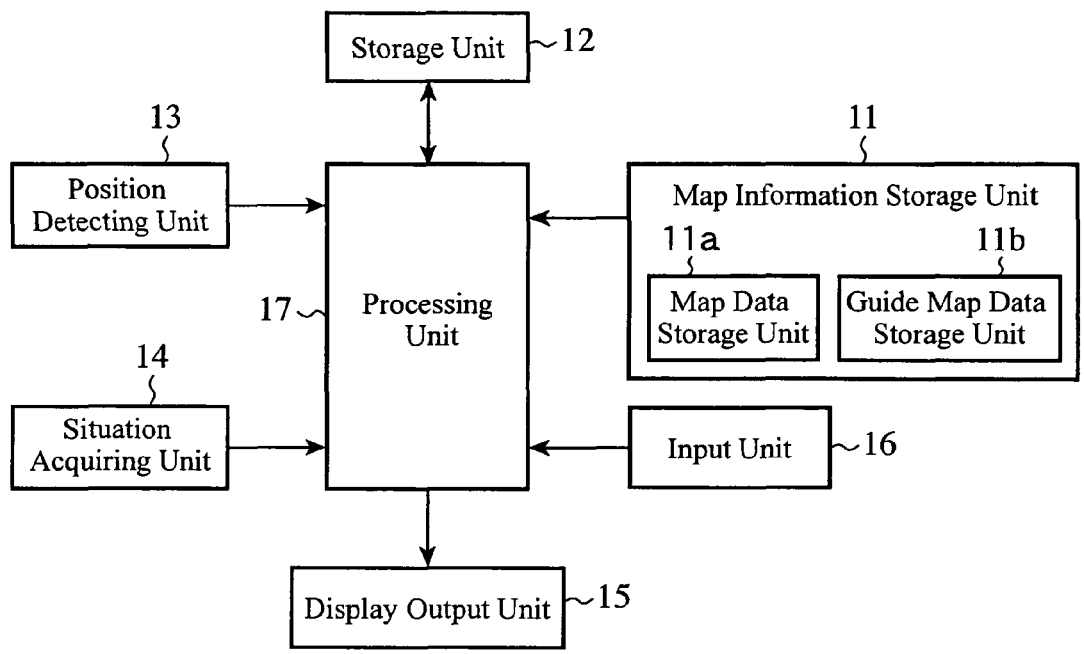
FIG. 1 is a block diagram showing the functional structure of a navigation apparatus in accordance with Embodiment 1 of the present invention.

FIG. 1 is a block diagram showing the functional structure of a navigation apparatus in accordance with Embodiment 1 of the present invention. This navigation apparatus is comprised of a map information storage unit 11, a storage unit 12, a position detecting unit 13, a situation acquiring unit 14, a display output unit 15, an input unit 16, and a processing unit 17.

The map information storage unit 11 can consist of a storage medium, such as a CD-ROM, a DVD-ROM, or a hard disk, and a disk drive for reading data recorded into the storage medium. As an alternative, the map information storage unit 11 can consist of a communication apparatus for receiving data from outside the navigation apparatus via communications, or the like. This map information storage unit 11 is comprised of a map data storage unit 11a and a guide map data storage unit 11b.

The map data storage unit 11a stores map data in which a guide map location pointer is included in data showing each guide point of road network data. The guide map data storage unit 11b stores a plurality of guide map data respectively used for drawing a plurality of guide maps each of which consists of a three-dimensional image of a view. Map data read from the map data storage unit 11a and guide map data read from the guide map data storage unit 11b are sent to the processing unit 17.

The storage unit 12 consists of, for example, a RAM, and is accessed by the processing unit 17. This storage unit 12 is used to temporarily store data which the processing unit 17 processes. For example, data showing an optimal route acquired through a route searching process which is carried out by the processing unit 17 are temporarily, as route-to-be-traveled data, stored in the storage unit 12.

The position detecting unit 13 is comprised of a GPS receiver, a velocity sensor, a gyroscope, and so on, and detects the current position of a vehicle equipped with the navigation apparatus on the basis of position data showing a current position which is detected by the GPS receiver, velocity data showing the velocity of the vehicle which is detected by the velocity sensor, and direction data showing the traveling direction in which the vehicle is moving which is detected by the gyroscope. Current position data showing the current position of the vehicle which is detected by this position detecting unit 13 are sent to the processing unit 17.

The situation acquiring unit 14 is comprised of, for example, various sensors and switches which are mounted inside or outside the vehicle, and acquires situation data showing a current situation which serve as conditions at the time of switching among guide maps. Concretely, the situation acquiring unit 14 acquires a current date and a current time from a time register not shown, acquires current intensity of illumination from an illuminometer not shown, and acquires an on/off state from a not-shown illumination switch for lighting up a lighting fixture for night. The situation data acquired by this situation acquiring unit 14 are sent to the processing unit 17.

The display output unit 15 consists of, for example, a CRT display device or a liquid crystal display, and displays a map including the current position of the vehicle and a guide route according to the display data sent thereto from the processing unit 17 and also displays a guide map when the vehicle reaches a guide point.

The input unit 16 is comprised of, for example, a touch panel placed on the screen of the display output unit 15, a remote controller, and an operation switch, and is used in order for the user to input a destination and so on, and to perform various settings. Data inputted from this input unit 16 are sent to the processing unit 17.

The processing unit 17 consists of, for example, a microcomputer, and controls the whole of the navigation apparatus. For example, the processing unit 17 carries out a route searching process of searching for an optimal route from the current position of the vehicle which is detected by the position detecting unit 13 to the destination inputted from the input unit 16 on the basis of the map data acquired from the map data storage unit 11a. When the current position of the vehicle which is indicated by the current position data sent from the position detecting unit 13 reaches a guide point on the map data acquired from the map data storage unit 11a, the processing unit 17 carries out a guide map display process of displaying a guide map according to the situation data acquired from the situation acquiring unit 14 (which will be mentioned below in detail).

Figure 2:
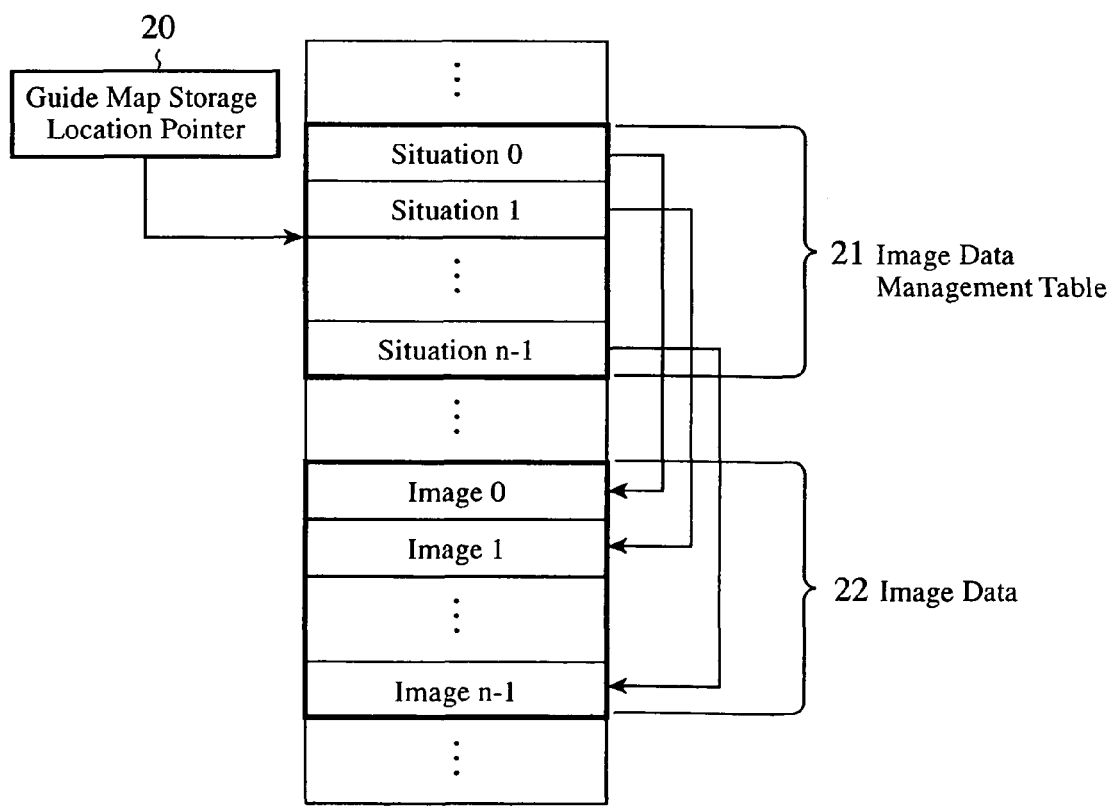
FIG. 2 is a diagram showing the data structure of map data and guide map data for use in the navigation apparatus in accordance with Embodiment 1 of the present invention.

Next, the data structure of the map data and the guide map data for use in the navigation apparatus in accordance with Embodiment 1 of the present invention will be explained with reference to FIG. 2.

The map data stored in the map data storage unit 11a have a well-known structure, and a guide map location pointer 20 is included in data showing each guide point of the road network data included in the map data. A guide map location pointer 20 holds a storage location in an image data management table 21.

The guide map data storage unit 11b stores the guide map data for each guide point. The guide map data for each guide point include an image data management table 21 and image data 22. The image data management table 21 holds pointers indicating the locations of a plurality of image data (images 1, 2, . . . , and n−1) which respectively correspond to a plurality of situation data (situations 0, 1, . . . , and n−1) each of which can be sent from the situation acquiring unit 14.

The image data 22 are data used for drawing a guide map which can be displayed when the vehicle reaches the corresponding guide point, and is comprised of a plurality of image data each of which is used for drawing a full-color three-dimensional image (a guide map) having a different view of the single corresponding guide point. The image data 22 can be created in various formats, such as a bitmap format and a JPEG format. Each image data included in the image data 22 does not need to be collectively stored at one place, and the order in which each image data is stored does not need to follow the order in which the pointers are stored in the image data management table 21.

Figure 3:
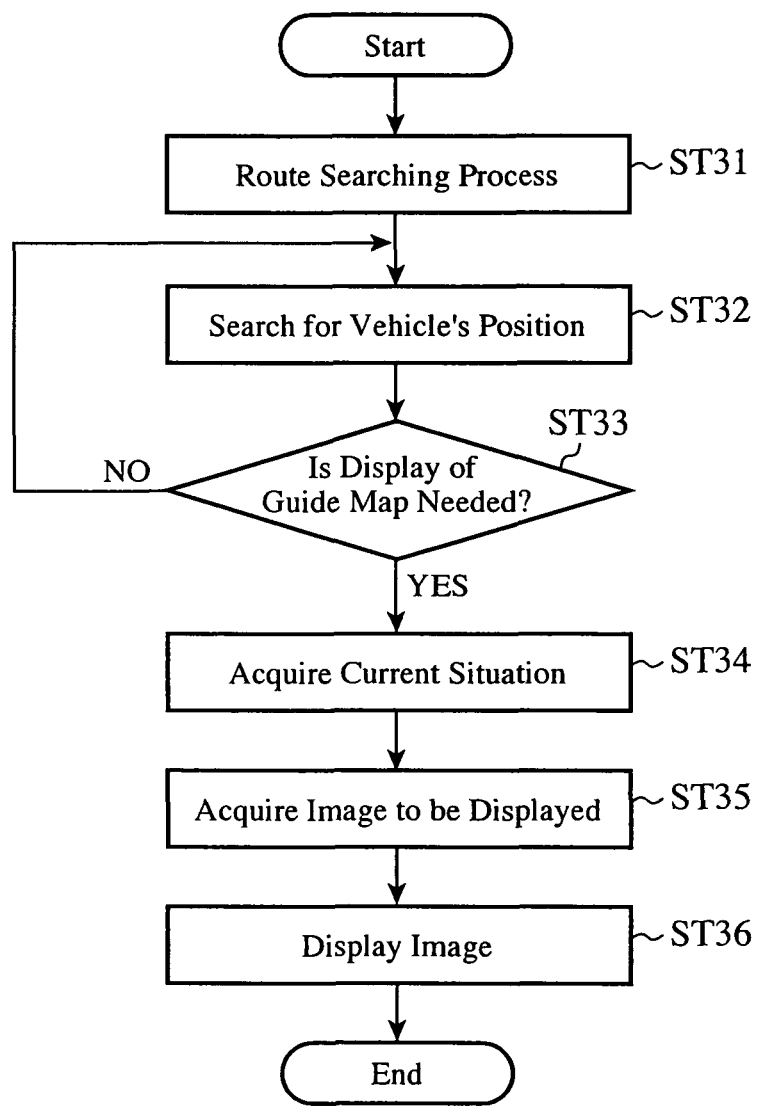
FIG. 3 is a flow chart briefly showing the operation of the navigation apparatus in accordance with Embodiment 1 of the present invention.

Next, the operation of the navigation apparatus in accordance with Embodiment 1 of the present invention which is constructed as mentioned above will be explained with reference to a flow chart shown in FIG. 3 by focusing on the process of displaying a guide map when the vehicle reaches a guide point on the route to be traveled.

First, the route searching process is carried out (step ST31). More specifically, the processing unit 17 searches for an optimal route from the current position of the vehicle which is detected by the position detecting unit 13 to the destination inputted from the input unit 16 on the basis of the map data read from the map information storage unit 11. Data showing the optimal route acquired through this route searching process are stored, as route to be traveled data, in the storage unit 12. After the route searching process is completed, map data are read from the map data storage unit 11*a* and are stored in the storage unit 12, and a map display process is then carried out. As a result, a map is displayed on the display output unit 15. After that, route guidance is started when the vehicle starts moving.

When route guidance is started, searching of the vehicle's position is carried out (step ST32). More specifically, the processing unit 17 acquires the current position data showing the current position of the vehicle from the position detecting unit 13. The processing unit 17 then checks to see whether or not a display of a guide map is needed (step ST33). Concretely, the processing unit 17 judges whether the vehicle has reached a point at which the navigation apparatus has to display a guide map, i.e., a guide point, by comparing the route-to-be-traveled data acquired in step ST31 with the current position data acquired in step ST32. For example, a guide point can be a point which is placed 500 m before a branch point on the route to-be-traveled. When the processing unit, in this step ST33, judges that any display of a guide map is not needed, the navigation apparatus returns to step ST32 and repeats the above-mentioned processing until the vehicle reaches a guide point.

In contrast, when the processing unit, in step ST33, judges that a display of a guide map is needed, the processing unit then carries out a process of acquiring a current situation (step ST34). More specifically, the processing unit 17 acquires situation data at the current time from the situation acquiring unit 14. The processing unit then acquires an image to be displayed (step ST35). More specifically, the processing unit 17 acquires the guide map location pointer 20 which is included in the data showing the guide point of the road network data included in the map data which are already read from the storage unit 12 in order to display a map, and then acquires an image data management table 21 from the location of the guide map data storage unit 11*b* which is indicated by this guide map location pointer 20. The processing unit then compares the situation data acquired in step ST34 with the image data management table 21 so as to select a pointer corresponding to the situation data from the image data management table 21, and then acquires the image data specified by this selected pointer out of the image data 22.

Finally, the navigation apparatus carries out a display of an image (step ST36). More specifically, the processing unit 17 combines the image data (the image of the guide map) acquired in step ST35 and the image data (the image of the map) generated on the basis of the map data so as to generate display data, and sends the display data to the display output unit 15. Thereby, the map and the guide map are displayed on the screen of the display output unit 15. In this case, the processing unit can generate the display data in such a way that, for example, the processing unit displays the map containing the route to be traveled and a current position mark on a left half of the screen of the display output unit 15, and displays the guide map on a right half of the screen.

As previously explained, the navigation apparatus in accordance with Embodiment 1 of the present invention is constructed in such a way as to prepare in advance image data 22 used for drawing a plurality of guide maps which correspond to a plurality of situations, respectively, and, when the current position of the vehicle reaches a guide point shown by the map data, displays a guide map according to a current situation acquired by the situation acquiring unit 14. Therefore, as compared with a conventional navigation apparatus which prepares color palettes having different color tones, switches among the color tones according to a current situation, and then displays a guide map, because the navigation apparatus in accordance with Embodiment 1 of the present invention is not dependent upon such color palettes and therefore does not need to accept restrictions on the number of colors, the navigation apparatus can display a full-color guide map. Therefore, because the navigation apparatus can provide a guide map which is close to a view which the driver can actually see, the visibility of the guide map can be improved and the driver can easily select the traveling direction in which he or she desires to travel toward his or her destination.

Embodiment 2

A navigation apparatus in accordance with Embodiment 2 of the present invention is modified from the navigation apparatus in accordance with Embodiment 1 in such a way that the navigation apparatus in accordance with Embodiment 2 acquires a current time from a situation acquiring unit 14 when a vehicle equipped with the navigation apparatus passes through a guide point, and then displays a guide map corresponding to a time zone to which the acquired current time belongs. The structure of the navigation apparatus in accordance with this Embodiment 2 is the same as that of the navigation apparatus shown in FIG. 1 except for the functions of the situation acquiring unit 14. The situation acquiring unit 14 acquires, as situation data, time information showing the current time from a not shown time register.

Figure 4:
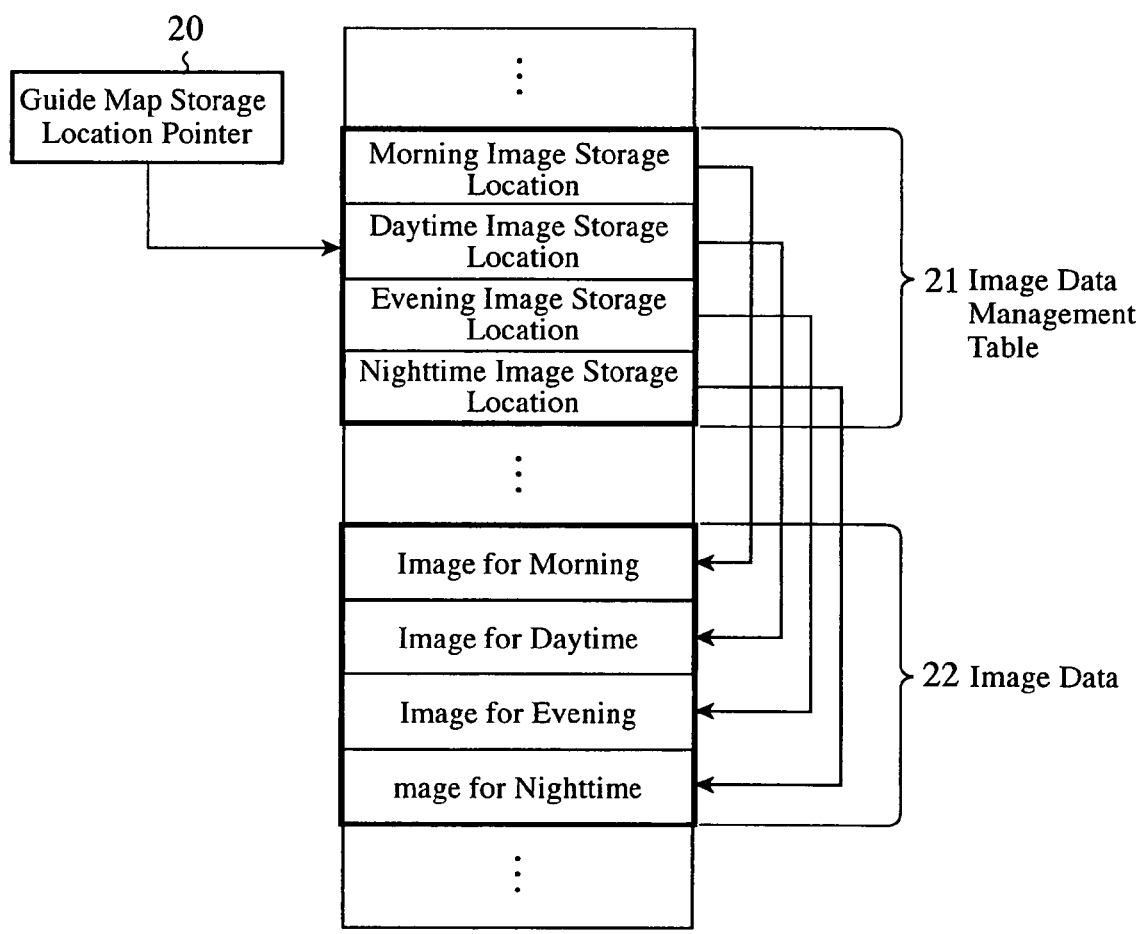
FIG. 4 is a diagram showing the data structure of map data and guide map data for use in navigation apparatuses in accordance with Embodiments 2 and 4 of the present invention.

FIG. 4 is a diagram showing the data structure of map data and guide map data for use in the navigation apparatus in accordance with Embodiment 2 of the present invention. Image data 22 are comprised of image data about an image for morning, an image for daytime, an image for evening, and an image for nighttime. In an image data management table 21, a morning image storage location indicating the storage location of the image for morning, a daytime image storage location indicating the storage location of the image for daytime, an evening image storage location indicating the storage location of the image for evening, and a nighttime image storage location indicating the storage location of the image for nighttime are stored.

Figure 5:
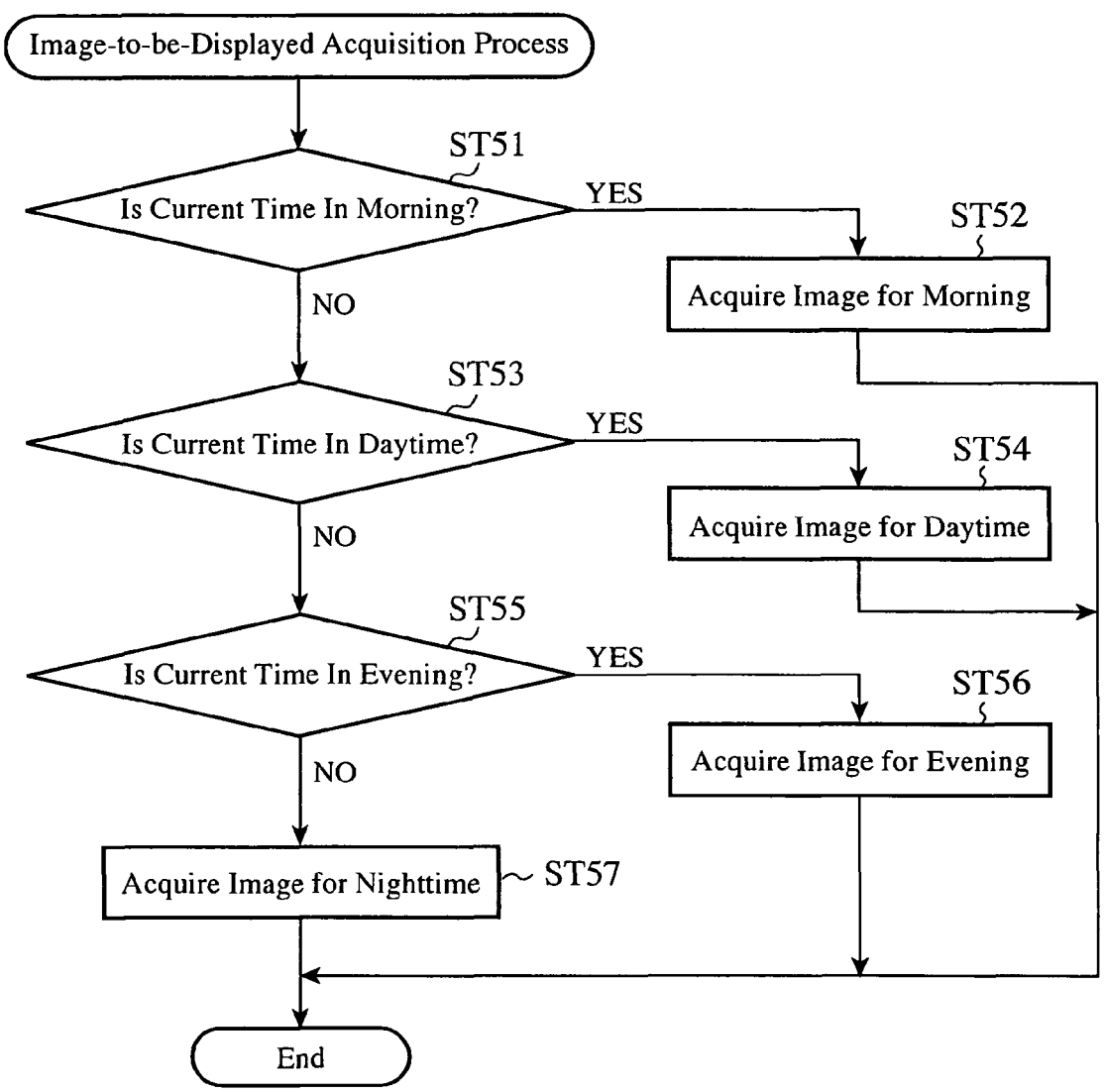
FIG. 5 is a flow chart showing the details of an object-to-be-displayed image acquisition process which is carried out by the navigation apparatuses in accordance with Embodiments 2 and 4 of the present invention.

Next, the operation of the navigation apparatus in accordance with Embodiment 2 of the present invention which is constructed as mentioned above will be explained. The operation of the navigation apparatus in accordance with this Embodiment 2 differs from that of the navigation apparatus in accordance with Embodiment 1 in the process of acquiring an image to be displayed (step ST35). Therefore, the details of the process of acquiring an image to be displayed will be explained hereafter with reference to a flow chart shown in FIG. 5.

In performing the process of acquiring an image to be displayed, the navigation apparatus checks to see whether or not the current time is in the morning first (step ST51). More specifically, the processing unit 17 extracts the time information from the situation acquiring unit 14, and then checks to see whether the current time shown by this extracted time information belongs to the time zone of the morning. When, in this step ST51, judging that the current time is in the morning, the processing unit acquires the image for morning (step ST52). More specifically, the processing unit 17 extracts the morning image storage location from the image data management table 21, and acquires the image data about the image for morning from the image data 22 by using, as the pointer, this extracted morning image storage location. After that, the processing unit ends the process of acquiring the image to be displayed.

When, in above-mentioned step ST51, judging that the current time is not in the morning, the processing unit then checks to see whether or not the current time is in the daytime (step ST53). More specifically, the processing unit 17 extracts the time information from the situation acquiring unit 14, and then checks to see whether the current time shown by this extracted time information belongs to the time zone of the daytime. When, in this step ST53, judging that the current time is in the daytime, the processing unit acquires the image for daytime (step ST54). More specifically, the processing unit 17 extracts the daytime image storage location from the image data management table 21, and acquires the image data about the image for daytime from the image data 22 by using, as the pointer, this extracted daytime image storage location. After that, the processing unit ends the process of acquiring the image to be displayed.

When, in above-mentioned step ST53, judging that the current time is not in the daytime, the processing unit 17 then checks to see whether or not the current time is in the evening (step ST55). More specifically, the processing unit 17 extracts the time information from the situation acquiring unit 14, and then checks to see whether the current time shown by this extracted time information belongs to the time zone of the evening. When, in this step ST55, judging that the current time is in the evening, the processing unit acquires the image for evening (step ST56). More specifically, the processing unit 17 extracts the evening image storage location from the image data management table 21, and acquires the image data about the image for evening from the image data 22 by using, as the pointer, this extracted evening image storage location. After that, the processing unit ends the process of acquiring the image to be displayed.

When, in above-mentioned step ST55, judging that the current time is not in the evening, the processing unit recognizes that the current time is in the nighttime and acquires the image for nighttime (step ST57). More specifically, the processing unit 17 extracts the nighttime image storage location from the image data management table 21, and acquires the image data about the image for nighttime from the image data 22 by using, as the pointer, this extracted nighttime image storage location. After that, the processing unit ends the process of acquiring the image to be displayed.

The judgments in steps ST51, ST53, and ST55 are based on conditions shown by equations (1) to (4), and, for example, these conditions are stored in advance in either the processing unit 17 or the storage unit 12. As an alternative, the conditions shown by the equations (1) to (4) can be input from the input unit 16.

Time zone of display of image for morning:
$$T1 <= \text{Time at the time of passing through guide point} < T2 \quad (1)$$

Time zone of display of image for daytime:
$$T2 <= \text{Time at the time of passing through guide point} < T3 \quad (2)$$

Time zone of display of image for evening: $T3 <= \text{Time}$ at the time of passing through guide point$< T4 \quad (3)$ Time zone of display of image for nighttime:
$$T4 <= \text{Time at the time of passing through guide point} < T1 \quad (4)$$

As previously explained, the navigation apparatus in accordance with Embodiment 2 of the present invention is constructed in such a way as to display a guide map according to the time zone to which the time when the vehicle passes through a guide point belongs. Therefore, the navigation apparatus can make a guide map displayed on the display output unit 15 be closer to a view which the driver can actually see, and makes it possible for the driver to easily select the traveling direction in which he or she desires to travel toward his or her destination.

Embodiment 3

A navigation apparatus in accordance with Embodiment 3 of the present invention is modified from the navigation apparatus in accordance with Embodiment 1 in such a way that the navigation apparatus in accordance with Embodiment 3 acquires the on/off state of an illumination from a situation acquiring unit 14 and displays a guide map corresponding to this acquired on/off state of the illumination when a vehicle equipped with the navigation apparatus passes through a guide point. The structure of the navigation apparatus in accordance with this Embodiment 3 is the same as that of the navigation apparatus shown in FIG. 1 except for the functions of the situation acquiring unit 14. The situation acquiring unit 14 acquires, as situation data, data showing the on/off state of an illumination switch (not shown) which lights up a lighting fixture for night.

Figure 6:
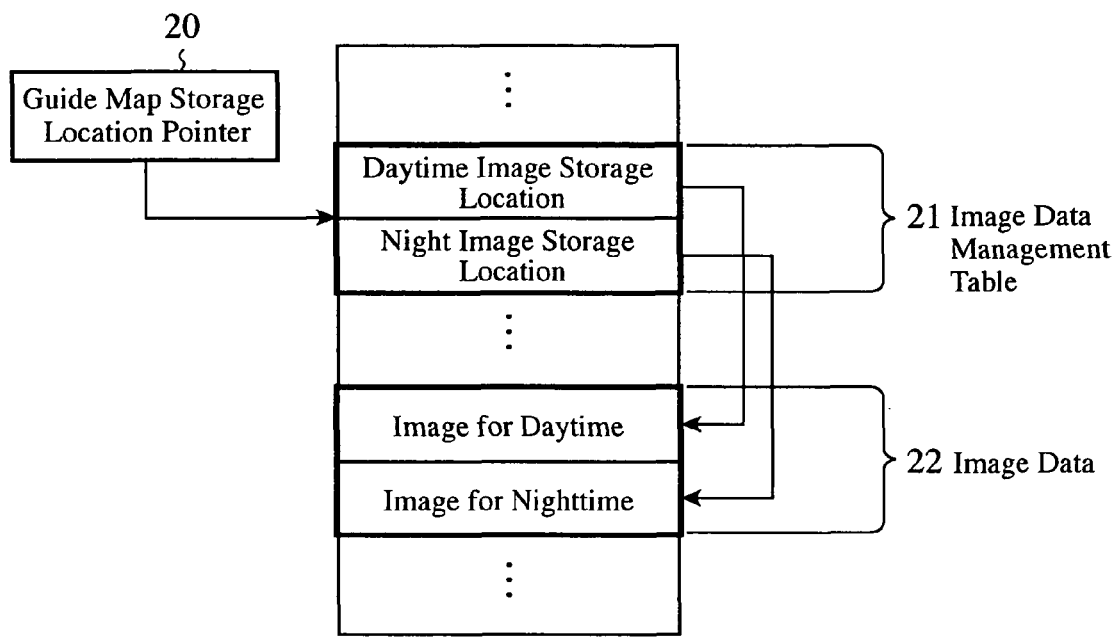
FIG. 6 is a diagram showing the data structure of map data and guide map data for use in a navigation apparatus in accordance with Embodiment 3 of the present invention.

FIG. 6 is a diagram showing the data structure of map data and guide map data for use in the navigation apparatus in accordance with Embodiment 3 of the present invention. Image data 22 include data about an image for daytime which is an image to be displayed at the time of the off state of the illumination, and data about an image for nighttime which is an image to be displayed at the time of the on state of the illumination. A daytime image storage location showing the storage location of the mage for daytime and a nighttime image storage location showing the storage location of the mage for nighttime are stored in an image data management table 21.

Figure 7:
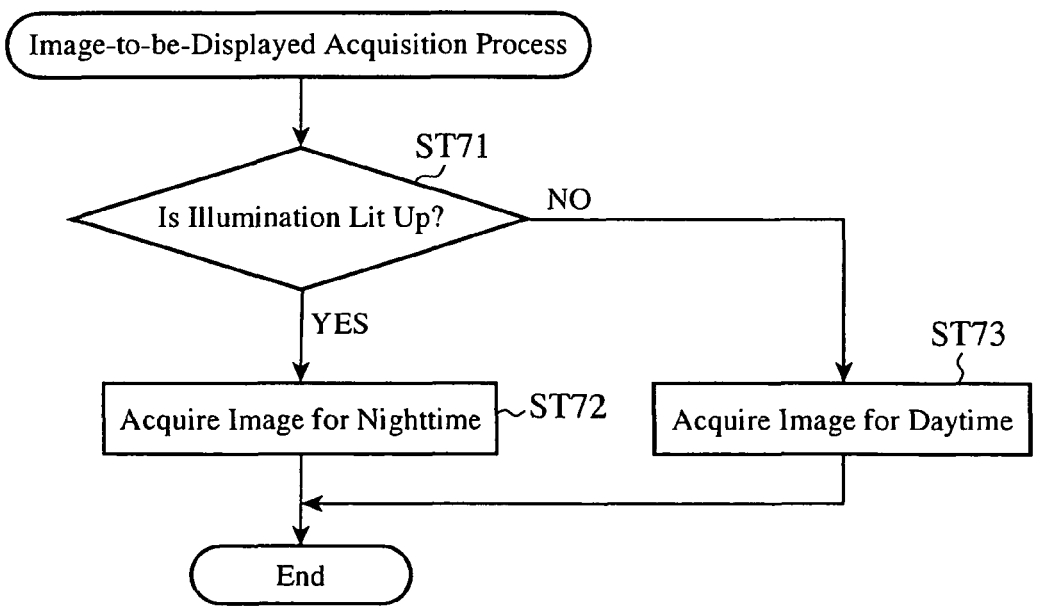
FIG. 7 is a flow chart showing the details of an object-to-be-displayed image acquisition process which is carried out by the navigation apparatus in accordance with Embodiment 3 of the present invention.

Next, the operation of the navigation apparatus in accordance with Embodiment 3 of the present invention which is constructed as mentioned above will be explained. The operation of the navigation apparatus in accordance with this Embodiment 3 differs from that of the navigation apparatus in accordance with Embodiment 1 in the process of acquiring an image to be displayed (step ST35). Therefore, the details of the process of acquiring an image to be displayed will be explained hereafter with reference to a flow chart shown in FIG. 7.

In performing the process of acquiring an image to be displayed, the navigation apparatus checks to see whether or not the illumination has been lit up first (step ST71). More specifically, the processing unit 17 extracts data showing the on/off state of the illumination switch from the situation acquiring unit 14, and then checks to see whether this extracted data showing the on/off state indicate an on state. When, in this step ST71, judging that the illumination has been lit up, the processing unit acquires the image for nighttime (step ST72) More specifically, the processing unit 17 extracts the nighttime image storage location from the image data management table 21, and acquires the image data about the image for nighttime from the image data 22 by using, as the pointer, this extracted nighttime image storage location. After that, the processing unit ends the process of acquiring the image to be displayed.

In contrast, when, in this step ST71, judging that the illumination has not been lit up yet, the processing unit acquires the image for daytime (step ST73). More specifically, the processing unit 17 extracts the daytime image storage location from the image data management table 21, and acquires the image data about the image for daytime from the image data 22 by using, as the pointer, this extracted daytime image storage location. After that, the processing unit ends the process of acquiring the image to be displayed.

As previously explained, the navigation apparatus in accordance with Embodiment 3 of the present invention is constructed in such a way as to display a guide map according to the on/off state of the illumination switch which lights up the lighting fixture for night of the vehicle. Therefore, the navigation apparatus can make a guide map displayed on the display output unit 15 be closer to a view which the driver can actually see, and makes it possible for the driver to easily select the traveling direction in which he or she desires to travel toward his or her destination.

Embodiment 4

A navigation apparatus in accordance with Embodiment 4 of the present invention is modified from the navigation apparatus in accordance with Embodiment 1 in such a way that the navigation apparatus in accordance with Embodiment 4 acquires current intensity of illumination from a situation acquiring unit 14 and displays a guide map corresponding to this acquired current intensity of illumination when a vehicle equipped with the navigation apparatus passes through a guide point. The structure of the navigation apparatus in accordance with this Embodiment 4 is the same as that of the navigation apparatus shown in FIG. 1 except for the functions of the situation acquiring unit 14. The situation acquiring unit 14 acquires, as situation data, current intensity of illumination which is measured by a not-shown illuminometer.

The data structure of map data and guide map data for use in the navigation apparatus in accordance with Embodiment 4 of the present invention is the same as that of Embodiment 2 as shown in FIG. 4. In this embodiment, switching among an image for morning, an image for daytime, an image for evening, and an image for nighttime is carried out according to the current intensity of illumination.

Figure 8:
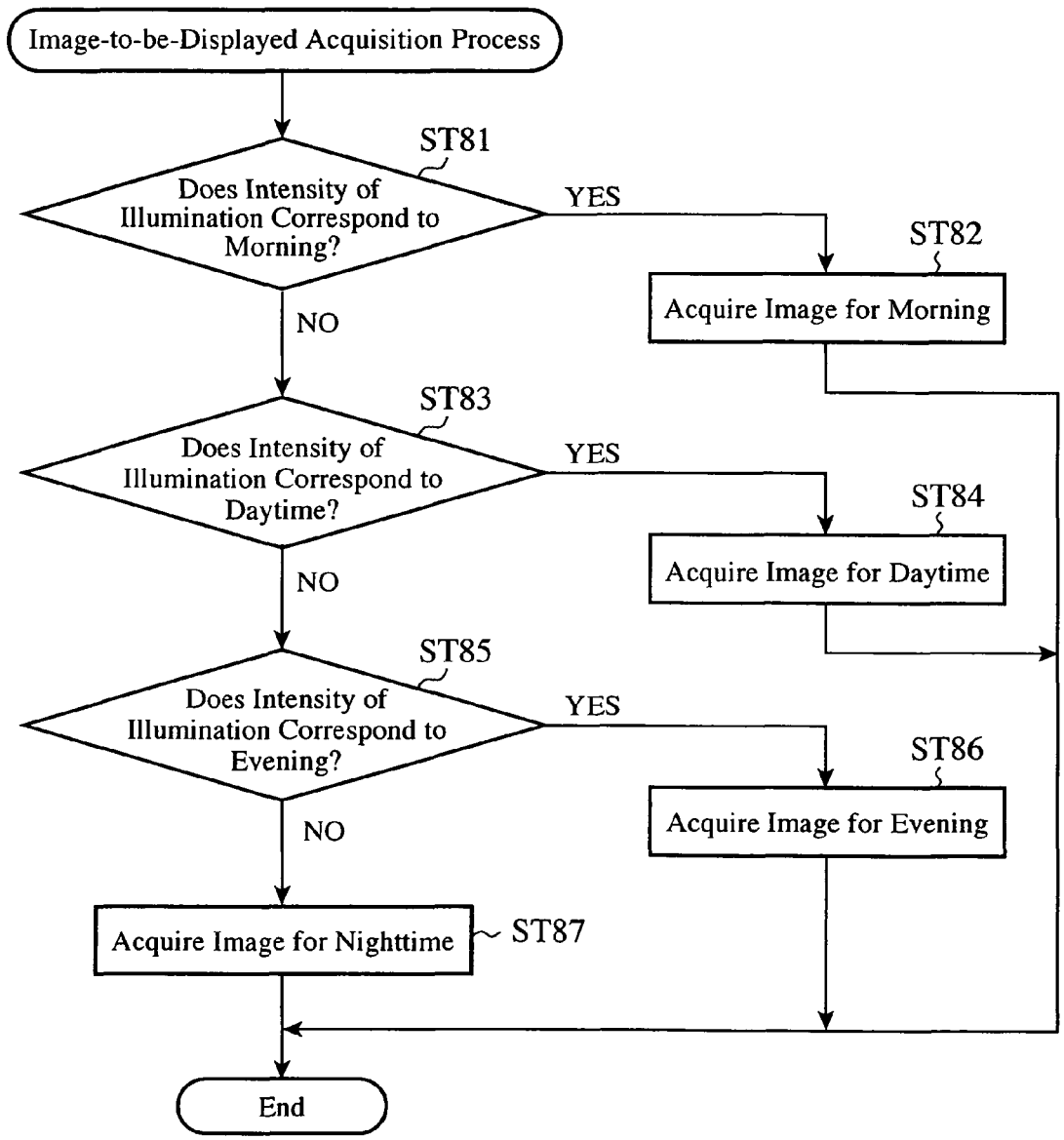
FIG. 8 is a flow chart showing the details of an object-to-be-displayed image acquisition process which is carried out by a navigation apparatus in accordance with Embodiment 4 of the present invention.

Next, the operation of the navigation apparatus in accordance with Embodiment 4 of the present invention which is constructed as mentioned above will be explained. The operation of the navigation apparatus in accordance with this Embodiment 4 differs from that of the navigation apparatus in accordance with Embodiment 1 in the process of acquiring an image to be displayed (step ST35). Therefore, the details of the process of acquiring an image to be displayed will be explained hereafter with reference to a flow chart shown in FIG. 8.

In performing the process of acquiring an image to be displayed, the navigation apparatus checks to see whether the current intensity of illumination shows the morning (step ST81) More specifically, the processing unit 17 extracts the current intensity of illumination from the situation acquiring unit 14, and then checks to see whether this extracted intensity of illumination corresponds to the time zone of the morning. When, in this step ST81, judging that the current intensity of illumination shows the morning, the processing unit acquires the image for morning (step ST82). The process of this step ST82 is the same as that of step ST52 shown in FIG. 5. After that, the processing unit ends the process of acquiring the image to be displayed.

When, in above-mentioned step ST81, judging that the current intensity of illumination does not show the morning, the processing unit then checks to see whether the current intensity of illumination shows the daytime (step ST83). More specifically, the processing unit 17 extracts the current intensity of illumination from the situation acquiring unit 14, and then checks to see whether this extracted current intensity of illumination corresponds to the time zone of the daytime. When, in this step ST83, judging that the current intensity of illumination shows the daytime, the processing unit acquires the image for daytime (step ST84). The process of this step ST84 is the same as that of step ST54 shown in FIG. 5. After that, the processing unit ends the process of acquiring the image to be displayed.

When, in above-mentioned step ST83, judging that the current intensity of illumination does not show the daytime, the processing unit then checks to see whether the current intensity of illumination shows the evening (step ST85). More specifically, the processing unit 17 extracts the current intensity of illumination from the situation acquiring unit 14, and then checks to see whether this extracted current intensity of illumination corresponds to the time zone of the evening. When, in this step ST85, judging that the current intensity of illumination shows the evening, the processing unit acquires the image for evening (step ST86). The process of this step ST86 is the same as that of step ST56 shown in FIG. 5. After that, the processing unit ends the process of acquiring the image to be displayed.

When, in above-mentioned step ST85, judging that the current intensity of illumination does not show the evening, the processing unit recognizes that the current intensity of illumination shows the nighttime and then acquires the image for nighttime (step ST87). The process of this step ST87 is the same as that of step ST57 shown in FIG. 5. After that, the processing unit ends the process of acquiring the image to be displayed.

The judgments in steps ST81, ST83, and ST85 are based on conditions shown by equations (5) to (8), and, for example, these conditions are stored in advance in either the processing unit 17 or the storage unit 12. As an alternative, the conditions shown by the equations (5) to (8) can be input from the input unit 16.

$$\begin{array}{l}\text{Intensity of illumination for display of image for}\\\text{morning: } B1 <= \text{Intensity of illumination at the}\\\text{time of passing through guide point} < B2\end{array} \quad (5)$$

Intensity of illumination for display of image for daytime: $B2 \leq$ Intensity of illumination at the time of passing through guide point $< B3$ \hfill (6)

Intensity of illumination for display of image for evening: $B3 \leq$ Intensity of illumination at the time of passing through guide point $< B4$ \hfill (7)

Intensity of illumination for display of image for nighttime: $B4 \leq$ Intensity of illumination at the time of passing through guide point $< B1$ \hfill (8)

As previously explained, the navigation apparatus in accordance with Embodiment 4 of the present invention is constructed in such a way as to display a guide map according to the current intensity of illumination of the surroundings, i.e., the brightness of the surroundings. Therefore, the navigation apparatus can make a guide map displayed on the display output unit 15 be closer to a view which the driver can actually see, and makes it possible for the driver to easily select the traveling direction in which he or she desires to travel toward his or her destination.

Embodiment 5

A navigation apparatus in accordance with Embodiment 5 of the present invention is modified from the navigation apparatus in accordance with Embodiment 1 in such a way that the navigation apparatus in accordance with Embodiment 5 acquires data showing a current season from a situation acquiring unit 14 and displays a guide map corresponding to the current season shown by this acquired data when a vehicle equipped with the navigation apparatus passes through a guide point. The structure of the navigation apparatus in accordance with this Embodiment 5 is the same as the navigation apparatus shown in FIG. 1 except for the functions of the situation acquiring unit 14. The situation acquiring unit 14 acquires, as situation data, data about a current date from a not-shown time register.

Figure 9:
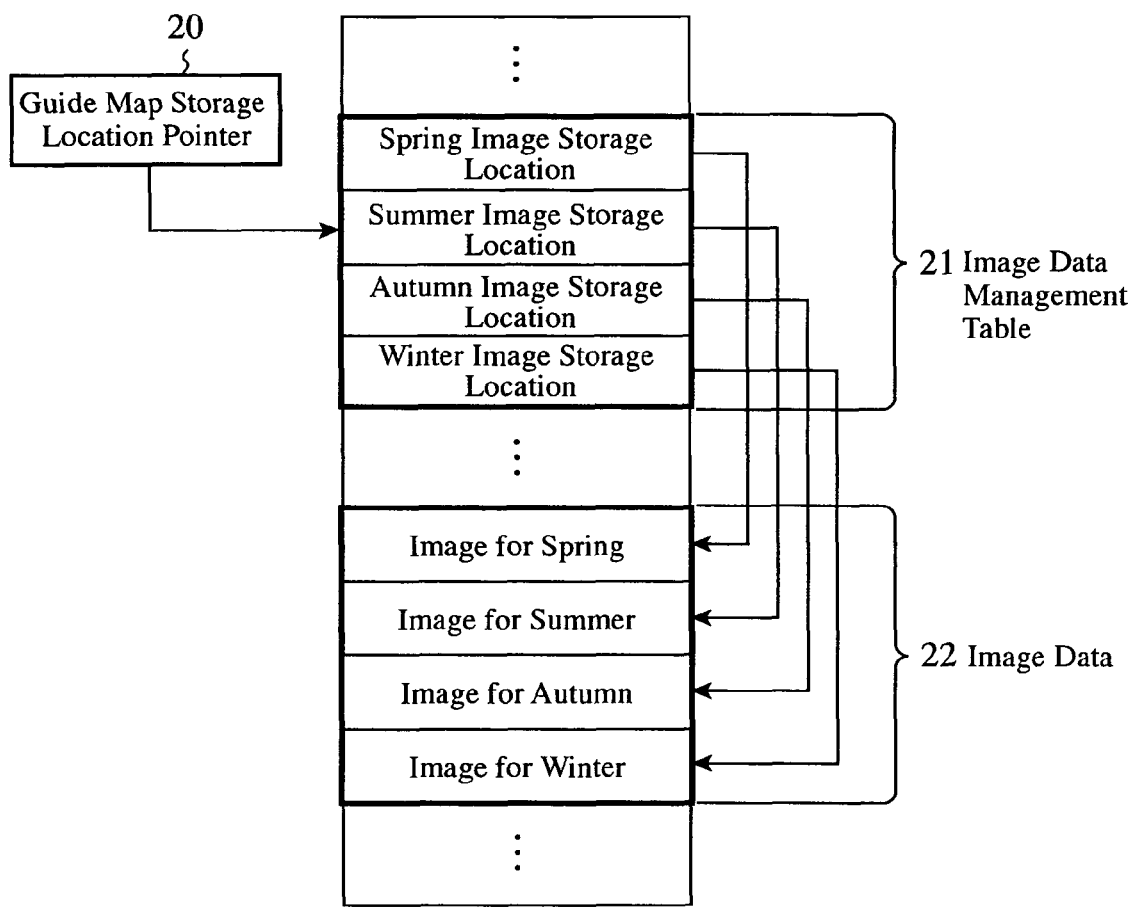
FIG. 9 is a diagram showing the data structure of map data and guide map data for use in a navigation apparatus in accordance with Embodiment 5 of the present invention.

FIG. 9 is a diagram showing the data structure of map data and guide map data for use in the navigation apparatus in accordance with Embodiment 5 of the present invention. Image data 22 are comprised of data about an image for spring, data about an image for summer, data about an image for autumn, and data about an image for winter. A spring image storage location indicating the storage location of the image for spring, a summer image storage location indicating the storage location of the image for summer, an autumn image storage location indicating the storage location of the image for autumn, and a winter image storage location indicating the storage location of the image for winter are stored in an image data management table 21. In this case, for example, the image for spring can be the one of a view containing spring flowers, and the image for autumn can be the one of a view containing autumnal leaves.

Figure 10:
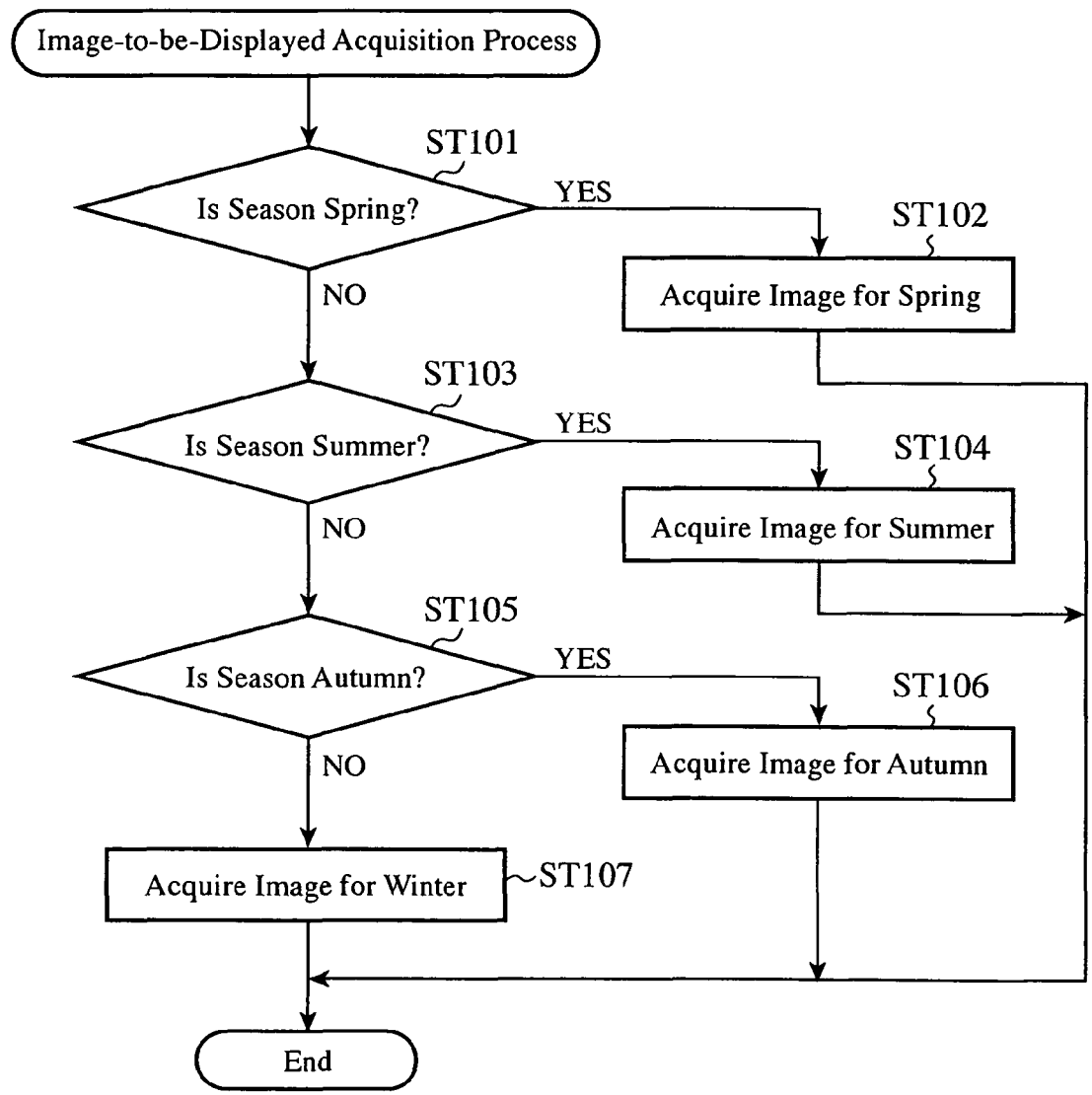
FIG. 10 is a flow chart showing the details of an object-to-be-displayed image acquisition process which is carried out by the navigation apparatus in accordance with Embodiment 5 of the present invention.

Next, the operation of the navigation apparatus in accordance with Embodiment 5 of the present invention which is constructed as mentioned above will be explained. The operation of the navigation apparatus in accordance with this Embodiment 5 differs from that of the navigation apparatus in accordance with Embodiment 1 in the process of acquiring an image to be displayed (step ST35). Therefore, the details of the process of acquiring an image to be displayed will be explained hereafter with reference to a flow chart shown in FIG. 10.

In the process of acquiring an image to be displayed, the navigation apparatus checks to see whether or not the current season is spring first (step ST101). More specifically, the processing unit 17 extracts date data showing the current date from the situation acquiring unit 14, and then checks to see whether the date shown by this extracted date data belongs to spring. When, in this step ST101, judging that the current season is spring, the processing unit acquires the image for spring (step ST102). More specifically, the processing unit 17 extracts the spring image storage location from the image data management table 21, and acquires the image data about the image for spring from the image data 22 by using, as the pointer, this extracted spring image storage location. After that, the processing unit ends the process of acquiring the image to be displayed.

When, in above-mentioned step ST101, judging that the current season is not spring, the processing unit then checks to see whether or not the current season is summer (step ST103). More specifically, the processing unit 17 extracts the date data from the situation acquiring unit 14, and then checks to see whether the date shown by this extracted date data belongs to summer. When, in this step ST103, judging that the current season is summer, the processing unit acquires the image for summer (step ST104). More specifically, the processing unit 17 extracts the summer image storage location from the image data management table 21, and acquires the image data about the image for summer from the image data 22 by using, as the pointer, this extracted summer image storage location. After that, the processing unit ends the process of acquiring the image to be displayed.

When, in above-mentioned step ST103, judging that the current season is not summer, the processing unit then checks to see whether or not the current season is autumn (step ST105) More specifically, the processing unit 17 extracts the date data from the situation acquiring unit 14, and then checks to see whether the date shown by this extracted date data belongs to autumn. When, in this step ST105, judging that the current season is autumn, the processing unit acquires the image for autumn (step ST106). More specifically, the processing unit 17 extracts the autumn image storage location from the image data management table 21, and acquires the image data about the image for autumn from the image data 22 by using, as the pointer, this extracted autumn image storage location. After that, the processing unit ends the process of acquiring the image to be displayed.

When, in above-mentioned step ST105, judging that the current season is not autumn, the processing unit recognizes that the current season is winter and then acquires the image for winter (step ST107). More specifically, the processing unit 17 extracts the winter image storage location from the image data management table 21, and acquires the image data about the image for winter from the image data 22 by using, as the pointer, this extracted winter image storage location. After that, the processing unit ends the process of acquiring the image to be displayed.

The judgments in steps ST101, ST103, and ST105 are based on conditions shown by equations (9) to (12), and, for example, these conditions are stored in advance in either the processing unit 17 or the storage unit 12. As an alternative, the conditions shown by the equations (9) to (12) can be input from the input unit 16.

Period of display of image for spring: $D1 \leq$ Date at the time of passing through guide point $< D2$ \hfill (9)

Period of display of image for summer: $D2 \leq$ Date at the time of passing through guide point $< D3$ \hfill (10)

Period of display of image for autumn: $D3 \leq$ Date at the time of passing through guide point $< D4$ \hfill (11)

Period of display of image for winter: $D4 \leq$ Date at the time of passing through guide point $< D1$ \hfill (12)

Furthermore, for the equations (9) to (12), the set of D1 to D4 can be prepared for each region because the four periods which are defined as the four seasons vary region from region. In this case, the processing unit acquires data showing the region in which the navigation apparatus is used from the position detecting unit 13, and uses the set of D1 to D4 corresponding to the region on the basis of the data showing the region.

As previously explained, the navigation apparatus in accordance with Embodiment 5 of the present invention is constructed in such a way as to display a different guide map according to the season at the time when the vehicle passes through a guide point. Therefore, the navigation apparatus can make a guide map displayed on the display output unit 15 be closer to a view which the driver can actually see, and makes it possible for the driver to easily select the traveling direction in which he or she desires to travel toward his or her destination.

INDUSTRIAL APPLICABILITY

As mentioned above, the navigation apparatus in accordance with the present invention is constructed in such a way as to display a guide map according to the situation surrounding the position of a vehicle equipped with the navigation apparatus, thereby being able to provide a high-quality guide map which is closer to a view which the driver can actually see, and improving the visibility of the guide map. Therefore, the navigation apparatus in accordance with the present invention is suitable for being used as vehicle-mounted navigation apparatus.

The invention claimed is:

1. A navigation apparatus comprising:
   a map data storage unit for storing map data in which a guide map location pointer is included in data showing each guide point;
   a guide map data storage unit for, for each guide point, storing a plurality of different guide map color images respectively corresponding to different situations during which a view of the guide point may be drawn as a color guide map to facilitate a driver's selection of a traveling direction at a branch point;
   a position detecting unit for detecting a current position;
   a situation acquiring unit for acquiring as a current situation one of the situations respectively corresponding to the plurality of different guide map color images stored for each guide point, allowing selection between said plurality of different stored guide map color images for the current position based on the current situation, the situation acquiring unit including at least one of: an on/off state of an illumination switch which lights up a lighting fixture for night, and intensity of illumination;
   a processing unit for, when the current position detected by said position detecting unit reaches a guide point shown by map data acquired from said map data storage unit, acquiring a guide map color image corresponding to the current situation acquired by said situation acquiring unit from a guide map location of said guide map data storage unit which is shown by a guide map location pointer included in data showing said guide point, and then combining data of the acquired guide map color image with the map data acquired from said map data storage unit so as to generate display data; and
   a display output unit for displaying a map and a guide map according to the display data generated by said processing unit.

2. The navigation apparatus according to claim 1, wherein said guide map data storage unit stores, for each guide point, a plurality of different guide map color images corresponding to different time periods,
   said situation acquiring unit acquires a current time, and
   when the current position detected by said position detecting unit reaches a guide point shown by the map data acquired from said map data storage unit, said processing unit acquires a guide map color image corresponding to a time period to which the current time acquired by said situation acquiring unit belongs from a guide map location of said guide map data storage unit which is shown by a guide map location pointer included in data showing said guide point, and then combines data of the acquired guide map color image with the map data acquired from said map data storage unit so as to generate display data.

3. The navigation apparatus according to claim 1, wherein said guide map data storage unit stores, for each guide point, a plurality of different guide map color images corresponding to different seasons,
   said situation acquiring unit acquires a current date, and
   when the current position detected by said position detecting unit reaches a guide point shown by the map data acquired from said map data storage unit, said processing unit acquires guide map image data corresponding to a season to which the current date acquired by said situation acquiring unit belongs from a guide map location of said guide map data storage unit which is shown by a guide map location pointer included in data showing said guide point, and then combines data of the acquired guide map color image with the map data acquired from said map data storage unit so as to generate display data.

4. The navigation apparatus according to claim 1, wherein said processing unit is programmed to generate as part of the display data a color three-dimensional image of a particular view of a guide point based on the current position and the acquired guide map color image.

5. The navigation apparatus according to claim 1, wherein said processing unit is programmed to generate as part of the display data different images when different guide points are reached, even if the guide points are reached under same situation.

* * * * *